United States Patent [19]
Jenkins

[11] 3,869,361
[45] Mar. 4, 1975

[54] METHOD FOR MAKING AN ELECTRICALLY-CONDUCTIVE CONNECTION SPECIFICALLY FOR UNDERGROUND LINES

[75] Inventor: John C. Jenkins, Lorain, Ohio
[73] Assignee: TRW Inc., Cleveland, Ohio
[22] Filed: Dec. 26, 1972
[21] Appl. No.: 318,191

[52] U.S. Cl........... 204/148, 204/197, 174/37 94 R, 339/14 R, 219/98.99, 269/3
[51] Int. Cl... C23f 13/00, B23k 11/04, H02g 15/08
[58] Field of Search .......... 204/147, 148, 196, 197; 174/6, 7, 37, 94 R, 94 S; 339/14 R, 14 L, 14 P, 14 RP, 14 T; 219/98–100

[56] References Cited
UNITED STATES PATENTS

| | | | |
|---|---|---|---|
| 2,423,290 | 7/1947 | Bonwitt............................ | 204/148 |
| 2,620,297 | 12/1952 | Stobie et al........................ | 204/197 |
| 2,885,462 | 5/1959 | Sylvester........................... | 174/94 R |
| 3,037,925 | 6/1962 | Boncher et al..................... | 204/197 |
| 3,354,063 | 11/1967 | Shutt................................ | 204/197 |
| 3,458,643 | 7/1969 | Dorr................................ | 204/196 |
| 3,551,587 | 12/1970 | Propst.............................. | 174/37 |
| 3,603,762 | 9/1971 | Spisak.............................. | 219/98 |
| 3,725,669 | 4/1973 | Tatum.............................. | 174/6 |

Primary Examiner—T. Tung
Attorney, Agent, or Firm—Allen D. Gutchess, Jr.

[57] ABSTRACT

A method and apparatus are provided for making electrically conductive connections for underground gas lines or pipes. To make such a connection, an access hole is first made from the surface of the ground down to a point adjacent the pipe. With a portion of the surface of the pipe exposed, a long cleaning tool is extended down into the hole and the exposed surface of the pipe is cleaned. A weldable stud with a conductor attached to an end thereof is then welded to the cleaned portion of the pipe by the use of a welding tool with a long extension, so that the weld can be made by an operator on the surface of the ground. The other end of the conductor affixed to the stud is attached to a magnesium anode which can also be located in the same hole used to provide access to the underground pipe. The stud conductor can also be connected to test equipment located at the ground surface, rather than to the magnesium anode. A holder located at the end of the extension of the stud welding tool for holding a ferrule around the stud as it is welded to the pipe is resiliently mounted relative to the extension so that accidental crushing of the ferrule is avoided. An electrical connection also can be made between ends of adjacent pipe sections to assure electrical continuity therebetween. This connection is in the form of a conducting strap which is welded by studs to both of the pipe sections and to an intermediate coupling. The extension of the welding tool can be provided with a grip for engaging and holding the strap as it is welded to the pipe sections.

7 Claims, 10 Drawing Figures

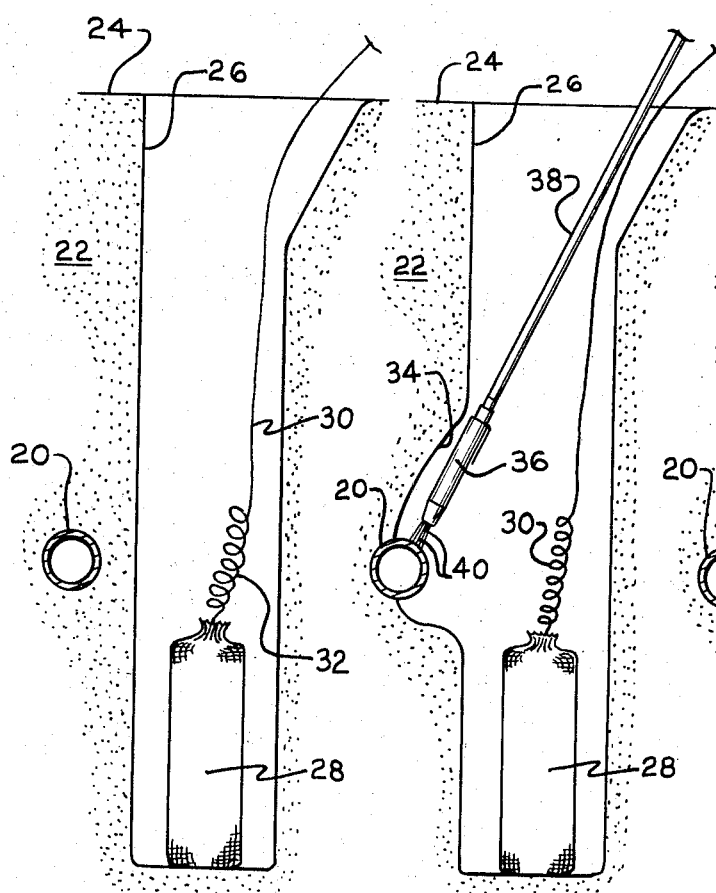
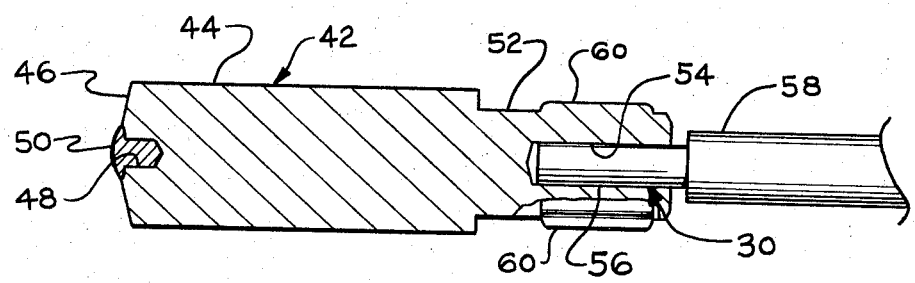

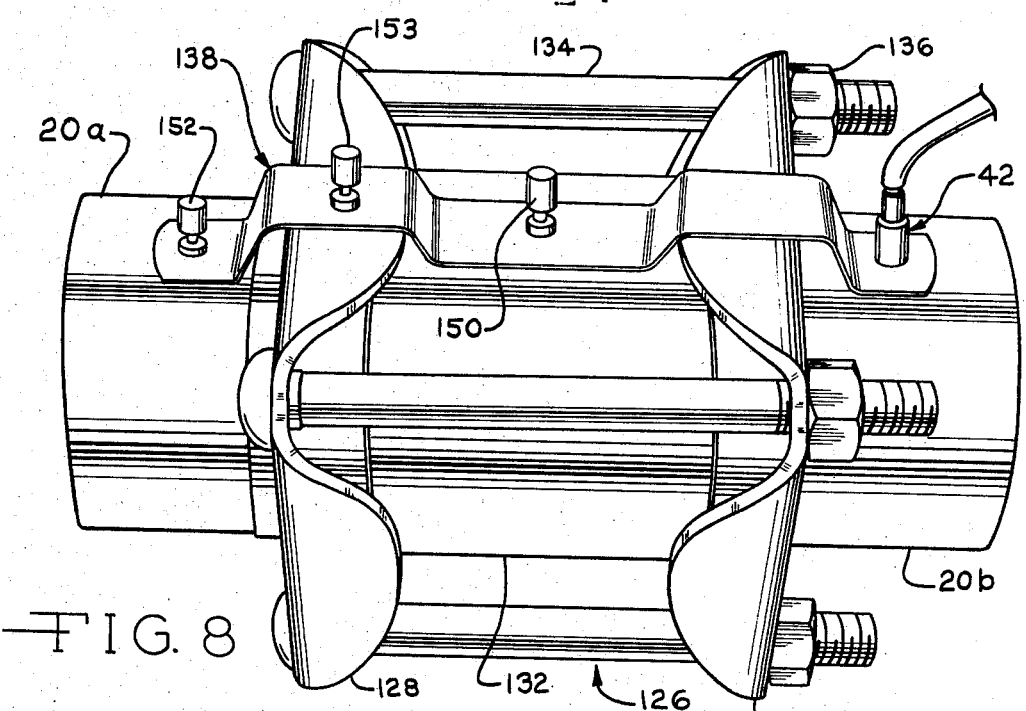
FIG. 8
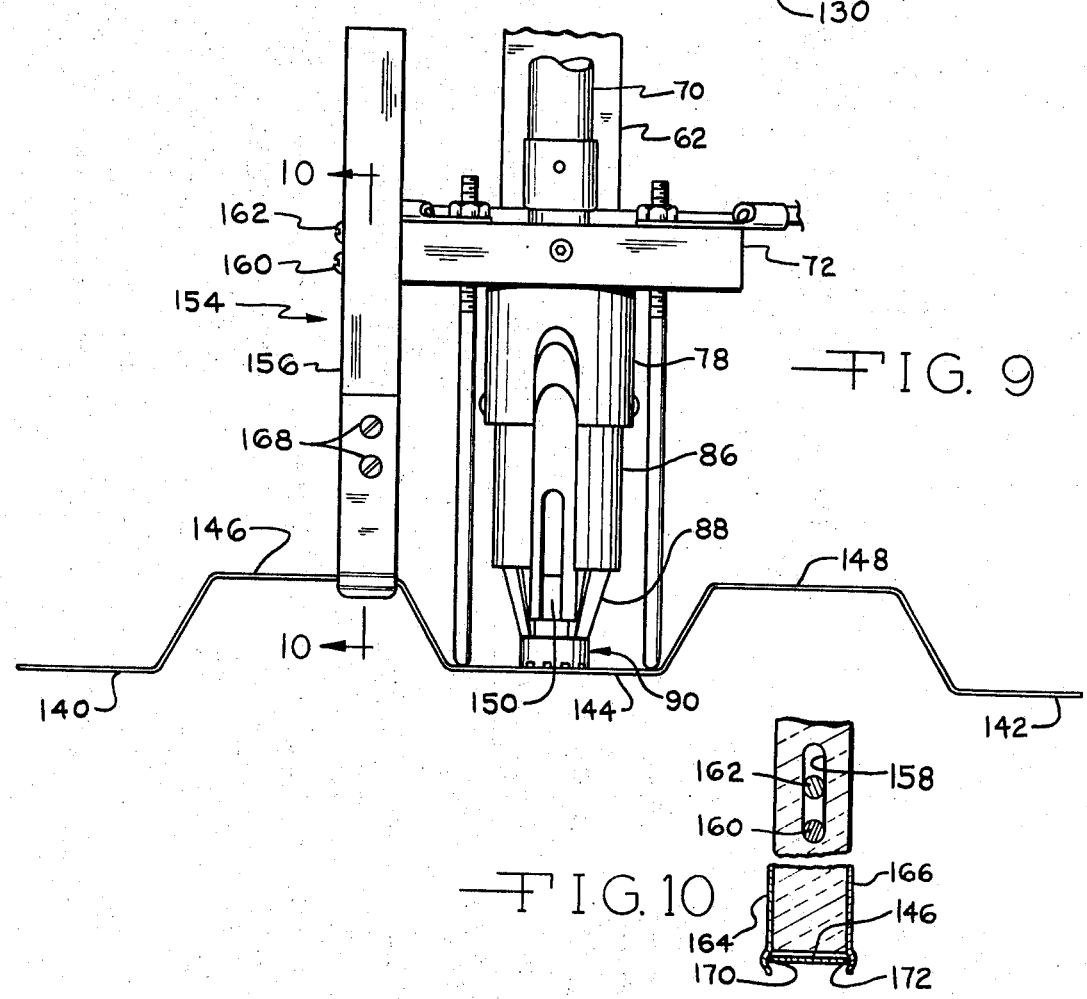
FIG. 9
FIG. 10

METHOD FOR MAKING AN ELECTRICALLY-CONDUCTIVE CONNECTION SPECIFICALLY FOR UNDERGROUND LINES

This invention relates to a method and apparatus for welding studs and specifically for making electrically conductive connections for underground pipes.

It is becoming a more and more common practice to provide existing underground pipes with protection against deterioration, and specifically corrosion. This is usually accomplished by connecting anodes of magnesium or the like electrically to the pipes at predetermined intervals therealong. Over a period of time, the anodes deteriorate rather than the pipes, thereby greatly extending the life of the pipes and reducing the danger of gas leaks. A recent federal ruling requires that all existing underground gas pipes be provided with this cathodic protection.

While such protection for newly-installed gas pipes is relatively simple, similarly protecting older underground pipes presents a much greater problem. In order to provide such protection, it is common to dig a relatively large hole, approximately three to four feet square, adjacent the underground pipe, this being commonly made with a back hoe. A worker than has to enter the hole, clean the pipe, and weld a conductor to it, this usually being accomplished by a Cadweld or similar process. The quality of the "weld" so produced often tends to be less than desirable, particularly if extreme care is not excercised in cleaning the pipe initially. Consequently, it is common practice to loop the conducting wire around the pipe once or twice before affixing it to the pipe, which also necessitates removing the earth completely around a portion of the pipe. Because of the large hole required, extensive repair of lawns, streets, etc., is a concomitant disadvantage in this process.

In accordance with the invention, a method and apparatus for welding electrically conductive connections to underground pipes are provided which have many advantages and none of the disadvantages noted above. A relatively small access hole in the order of ten to twelve inches in diameter can be made by use of an auger, if desired, from the surface of the ground to a point adjacent the gas pipe and preferably extending below the pipe. The earth immediately adjacent a portion of the pipe is then chipped away to expose the portion of the pipe. The surface of the pipe can then be cleaned by a needle scaler, which is commercially available, and which has a long handle enabling the operator to accomplish this step from the surface of the ground. A magnesium anode can be placed in the hole below the pipe and a conductor of the anode attached to an end weldable stud. The stud is then placed in the chuck of a long extension of a drawn-arc welding tool and welded to the cleaned pipe surface by an operator located on the surface of the ground. The overall operation can be completed in a manner of minutes. Further, the small hole results in a minimum of repair to or reconstruction of the site.

The stud used to effect the weld between the pipe and the electrical conductor preferably has an elongate hole in the end opposite the weldable end into which an end of the conductor is placed and subsequently held by crimping a portion of the stud around the elongate hole. The stud is then welded to the pipe with the use of a unique chuck having a slotted end to accommodate the stud and the conductor. The ferrule holder located around the chuck also is slotted to receive the conductor. The ferrule holder further features a resilient mounting arrangement enabling the holder to yield when the ferrule is pressed against the pipe. This prevents accidental crushing of the ferrule, which is relatively easy to do when located some distance away from the operator at the end of the long extension provided on the welding tool.

Since each section of pipe is not connected directly to a magnesium anode, it is essential that electrical conductivity be maintained between pipe sections to provide cathodic protection for all of them. The pipe sections are mechanically coupled together and conductivity, which is initially provided by a wire attached by the Cadwelding process to the pipe sections and across the coupling, can be lost over a period of time because of corrosion, dirt, rust, etc.

In accordance with the invention, an electrically conductive strap is welded to adjacent ends of both pipe sections and to a component of the coupling to assure electrical conductivity throughout. Two of these welds can be made by studs which are welded through the strap to affix it to a pipe section and coupling. A third stud, which accomplishes the same purpose, can also be provided with an electrical conductor to which the anode is connected.

In accordance with the invention, a unique strap holding grip is affixed to the same foot which supports the ferrule holder. This apparatus thus enables both the strap and the stud to be positioned against the pipe by the same welding tool and enables the strap and stud to be welded all in one operation by an operator at the surface of the ground.

It is, therefore, a principal object of the invention to provide an improved method of providing cathodic protection for existing underground gas pipes or other piping requiring such protection.

Another object of the invention is to provide improved apparatus for providing cathodic protection for underground gas pipes.

A further object of the invention is to provide an end weldable stud for connecting a conductor to a metal workpiece.

Yet another object of the invention is to provide a stud welding tool having a resiliently mounted ferrule holder to minimize accidental crushing of ferrules held thereby.

Yet a further object of the invention is to provide a workpiece holder for a stud welding tool for holding a workpiece as a stud is being welded by the tool.

Still another object of the invention is to provide an improved electrical connection between two adjacent pipe sections.

Yet a further object of the invention is to provide a method and apparatus for making an electrically conductive connection with an underground pipe more quickly and less expensively.

Many other objects and advantages of the invention will be apparent from the following detailed description of preferred embodiments thereof, reference being made to the accompanying drawings, in which:

FIG. 1 is a schematic view in vertical cross section showing an underground gas pipe with an access hole formed nearby and an anode in place in the hole;

FIG. 2 is a view similar to FIG. 1 but with the hole chipped out to provide direct access to the pipe from the surface of the ground and with a cleaning tool in place to clean a portion of the surface of the pipe;

FIG. 3 is a view similar to FIG. 2 but with a stud welding tool positioned in place of the cleaning tool and ready to weld a stud to the pipe, a conductor of the anode being connected to the stud;

FIG. 4 is a greatly enlarged view in longitudinal cross section taken through a stud with an electrical conductor affixed thereto in accordance with the invention;

FIG. 8 is a perspective view of two adjacent pipe sections, a coupling, and an electrically conductive strap welded in place;

FIG. 9 is a somewhat schematic view in elevation of a welding foot and related components, along with a workpiece holder attached to the foot and engaging the electrically conductive strap of FIG. 8; and FIG. 10 is a fragmentary view in longitudinal cross section, taken along the line 10—10 of FIG. 9.

Figure 5:
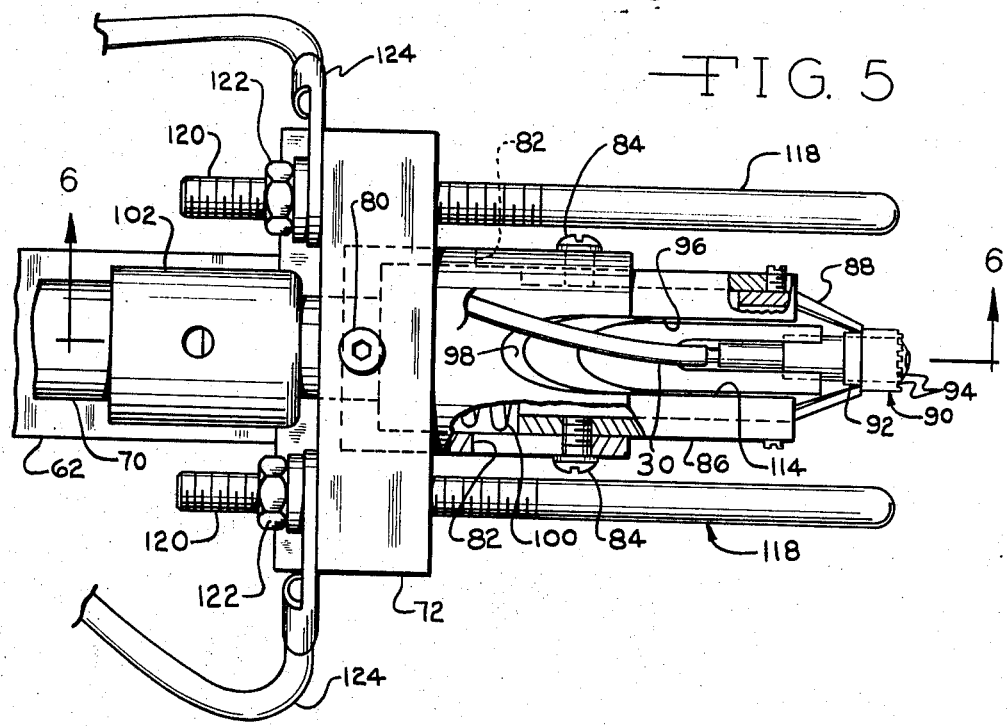
FIG. 5 is an enlarged view in elevation, with parts broken away and with parts in section, of a welding foot, ferrule holder, chuck, and related components at the end of a welding tool extension.

Referring to the drawings, and particularly to FIG. 1, a gas line or pipe 20 is shown in transverse section, in ground or earth 22 well below a surface 24 thereof. The pipe 20 may have been installed a number of years ago, at which time pipes were not provided with cathodic protection against deterioration. Consequently, such pipes often needed replacement every twenty to thirty years, by way of example, and may deteriorate to the point of leaking prior to such time, in which instance obvious dangerous conditions can result. Because of such factors, it is now common to provide cathodic protection for gas pipes and, in fact, a federal ruling now requires that this be done for existing underground pipes.

To provide cathodic protection, the common practice heretofore has been to dig by means of a back hoe a relatively large hole, in the order of three feet or four feet square, down to a point near the pipe. The hole must be of substantial size in order for a workman to enter it. The earth is then dug away around the pipe, usually completely around it, and a wire or conductor affixed to the pipe after it is cleaned. The conductor usually is affixed by the Cadweld process, as is known in the art. This is accomplished by placing a Cadweld crucible on the pipe, charging the crucible, and igniting the mixture to produce the "weld." The quality of the weld often is less than satisfactory, particularly if extreme care is not exercised in cleaning the pipe. In an effort to improve the connection, it is common practice to loop the conductor completely around the pipe once or twice before welding it, particularly to avoid failure of the electrical connection between the conductor and the pipe when the hole is being backfilled. This requires the earth to be removed completely around the pipe. With a hole of this magnitude, extensive repair of lawns, through resodding and planting new grass, and streets, through repaving, patching, etc. was required. Beside the weld often being of poor quality, the overall process is also time consuming.

In accordance with the invention, an access hole 26 is formed in the ground, from the surface 24 preferably to a point below the pipe 20. The hole 26 can have a diameter of only ten inches to twelve inches since it is not necessary for a workman or operator to enter the hole. A hole of this size can be formed by means of an auger, for axample, in a short period of time, as compared to the time previously required to produce the large hole needed for the workman. After forming the hole 26, and prior to welding the stud to the pipe, a magnesium anode 28 is placed in the hole, the anode being slightly smaller than the diameter of the hole and resting on the bottom thereof. The anode 28 is a commercially available item and includes a bag having the magnesium, or other suitable metal, and chemicals therein to cause deterioration of the metal rather than deterioration of the pipe 20. The anode 28 has a conductor or wire 30 extending therefrom and suitably electrically connected thereto, with the conductor initially being in the form of a helical coil 32. The free end of the conductor is held when the anode is dropped in the hole so that the end of the conductor 30 is accessible above the surface 24 of the ground.

After the hole 26 is formed, the earth is chipped away around a portion of the pipe 20 to form a recess 34 so that the surface of the pipe is directly exposed to the surface 24 of the ground. This can be accomplished by any suitable long, spade-like tool. With the surface of the pipe 20 exposed, a needle scaler or other suitable cleaning tool 36, having a long handle 38 attached thereto, is employed to remove dirt, scale, tar, etc. from the surface of the pipe 20. The needle scaler 36 is a commercially available device and has a plurality of pins 40 at the lower end thereof. The pins are vibrated by means of compressed air to effectively clean the pipe in a short time.

With the surface of the pipe 20 cleaned, the free end of the anode conductor 30 is attached to a stud 42 and the stud affixed in an end of an extension 44 (FIG. 3) of a stud welding tool 46. The extension 44 is lowered into the hole 26 and the stud 42 pressed against the surface of the pipe 20. The tool 46 is then operated from above the surface 24 to weld the stud to the pipe 20 and thereby electrically connect the anode 28 through the conductor 30 and the stud 42 to the pipe 20. The hole 26 can then be filled to complete the operation. Since the hole 26 is of small diameter, it is relatively easy to repair the surface 24, whether it be grass, pavement, etc.

Referring particularly to FIG. 4, the stud 42 includes a main cylindrical body 44 having a shallow, conical end 46 with a central recess 48 from which a body 50 of flux extends and is mechanically held therein. The stud 42 has a rear cylindrical extension 52, opposite the weldable end, with an elongate bore or recess 54 therein. The conductor 30 has an end portion 56 stripped of insulation 58 and inserted into the bore 54. A crimping tool then squeezes the extension 52, forming ears 60 thereon, to mechanically connect the conductor 30 to the stud 42.

The welding tool 46 is of a known design and welds the stud 42 to the pipe 20 through a substantially conventional stud welding technique. In such technique, the stud is placed against the pipe with a ferrule therearound and the stud is withdrawn as an electrical potential is established between the stud and pipe, to form a pilot arc therebetween. Subsequently, a heavier, welding arc is established between the two with this welding arc preferably being maintained until the stud is plunged back against the pipe. Pools of molten metal are formed by the welding arc on both the stud and pipe to form a solid weld therebetween and to establish a good electrical connection between the electrical conductor and the pipe. A welding tool of the type under consideration can be similar to that disclosed more fully, by way of example, in U.S. Pat. No. 3,603,762.

The stud 42 can be used to make an electrical connection between the conductor 30 and the pipe 20 for other purposes than to connect the magnesium anode 28. For example, the studs 42 can be used with conductors to electrically connect spaced points on the pipe with test leads located in enclosures at the surface 24 of the ground.

The extension 44 enables the operator to weld the stud 42 to the pipe 20 without having to enter the access hole 26. The extension 44 (FIG. 3) includes a long, rigid, tubular supporting member 62 connected by a bar 64 to adjustable legs 66 of the tool 46. An intermediate portion of the supporting member 62 has a guide 68 which helps support and guide an elongate chuck leg 70 which extends from the tool 46 to the operating end of the extension 44.

Figure 6:
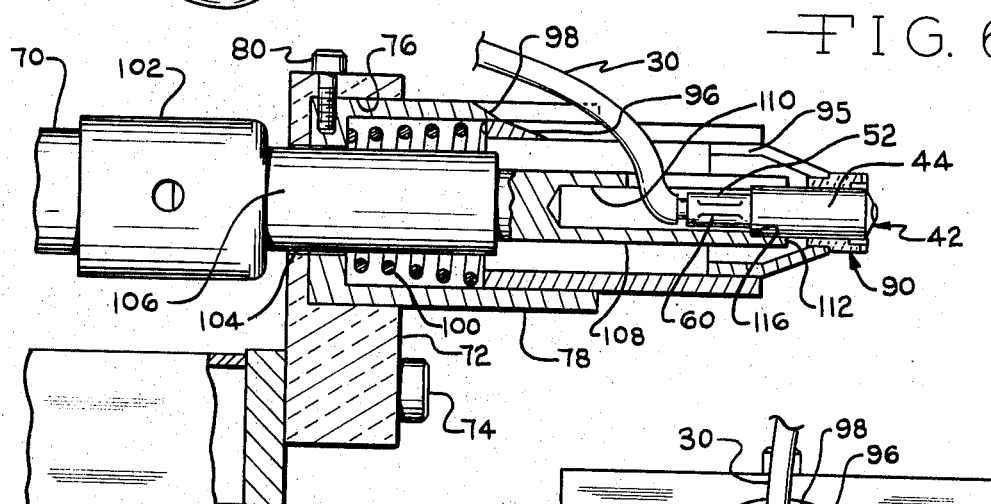
FIG. 6 is a view in cross section taken along the line 6—6 of FIG. 5.
Figure 7:
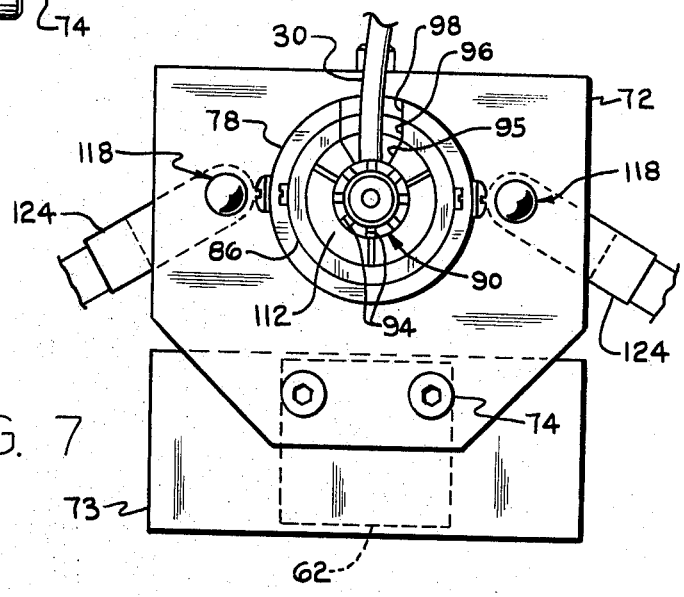
FIG. 7 is an end view of the welding tool foot and components of FIGS. 5 and 6.

Referring to FIGS. 5–7, a welding foot 72 is affixed by a plate 73 and fasteners 74 to the end of the supporting member 62. The foot 72, of insulating material, has a recess 76 in which a ferrule holder socket or hollow member 78 is affixed by fasteners 80. The socket 78 has guide slots 82 therein which receive pins or screws 84 extending radially outwardly from a ferrule holder 86. The ferrule holder 86 also includes a metal ferrule grip 88 having bifurcated fingers to engage a ferrule 90 of a substantially conventional design, including a neck 92 and a plurality of radially extending passages 94 in the outer, annular edge thereof. The grip 88 has a slot 95 and the holder 86 has a slot 96 extending a substantial distance therealong to enable the conductor 30 to pass therethrough, and the forward end of the socket 78 similarly has a notch 98 for this purpose.

The holder 86 is urged outwardly with the pins or screws 84 seated at the right ends of the slots 82, as viewed in FIG. 5, by a spring 100 located within the socket 78 and seated against an end of the holder 86. With this arrangement for the ferrule 90, if the ferrule should be pressed excessively hard against the pipe 20, the spring 100 will yield and enable the holder 86, the grip 88, and the ferrule 90 to retract relative to the socket 78. Thus, the ferrule will not be accidentally crushed, as would occur with the conventional rigid type ferrule holder and grip. This is particularly important when the weld is made through a long extension some distance from the operator, wherein the operator's control over the positioning of the ferrule is not as effective as when the stud is located just beyond the welding tool 46 in the usual manner.

The long chuck leg 70 of the extension 44 has a tapered socket 102 at the end thereof which frictionally receives a chuck 104. The chuck includes a rear cylindrical enlargement 106 which extends through the socket 78 and the foot 72, and a forward, hollow portion 108. The portion 108 has an elongate recess 110 therein with fingers 112 at the forward end along with a slot 114 to accommodate the conductor 30. The chuck has a shoulder 116 near the rear of the fingers 112 to engage the end of the portion 44 of the stud 42 to locate it in a predetermined position relative to the end of the chuck.

A pair of grouding pins 118 extend from the foot 72 to a location just back of the end of the stud 42 so that the stud is depressed or retracted slightly when the ends of the pins 118 engage the pipe 20. The ends of the pins are substantially in the plane of the ferrule 90 although the ferrule can extend slightly beyond the pins to assure that the ferrule seats against the pipe during welding. The pins 118 have threaded ends 120 and are adjustable relative to the foot 72 by nuts 122 which also hold ground conductors 124 in electrical contact with the pins 118. The ground conductors 124 are of a sufficient length to extend out of the access hole 26 and to a power source (not shown) for the welding tool 46.

Depending on conditions, one of the anodes 28 is placed along the pipe 20 every forty to fifty feet to provide adequate protection. However, to provide protection for adjacent pipe sections, it is essential that electrical continuity be maintained between the sections. The adjacent pipe sections are commonly held together by a mechanical coupling known in the art as a Dresser coupling. Referring to FIG. 8, two pipe sections 20a and 20b are connected by such a coupling indicated at 126. This coupling includes two spaced flanges 128 and 130 with a coupling cylinder 132 therebetween. Four bolts 134 and nuts 136 hold the flanges and pipe sections together. Since this is a mechanical connection, corrosion, dirt, rust, and perhaps other oxides can prevent an effective electrical connection from being achieved between adjacent sections. Heretofore, wires were Cadwelded to the sections across the various coupling components to attempt to assure electrical continuity between the sections 20a and 20b. However, corrosion, etc. would often break this continuity over a period of time.

In accordance with the invention, a bonding strap 138 of thin metal, e.g., 20 gauge steel, is welded to the pipe sections 20a and 20b and the coupling cylinder 132 to achieve reliable electrical continuity. The strap 138 includes two end tabs 140 and 142 and a central web 144, all of which lie in a common plane. A U-shaped, recessed connector 146 is located between the tab 140 and the central web 144 to bridge the flange 128. Similarly, a U-shaped, recessed connector 148 is located between the central web 144 and the tab 142 to bridge the flange 130. This enables the two end tabs 140 and 142 and the central web 144 to respectively engage the pipe section 20a, the pipe section 20b, and the coupling cylinder 132 when placed in contiguous relationship with the assembly.

To affix the connecting strap 138 to the assembly, a stud 150 is welded through the central web 144 to the coupling cylinder 132. This type of welding through a plate or strap to a workpiece is known in the art and is generally described in U.S. Pat. No. 2,635,167, for example. While the stud 150, as shown, has a reduced portion near its lower end, this is not necessary since the stud head need not be broken off after the welding is complete. The central stud 150 holds the strap 138 in place until a second stud 152 is welded through the tab 140 to the pipe section 20a. A third stud 153 can also be welded through one of the connectors 146 and 148 to electrically connect the flanges 128 and 130, if desired. One of the studs 42 can then be welded through the tab 142 to the pipe section 20b. Good electrical continuity is thereby attained between the strap and all components without any mechanical connections having to be relied upon.

While the strap 138 is an effective electrical connection, it must be placed in the access hole 26 without the necessity of an operator entering the hole. Further, it must be held in position while the first stud 150 is welded. To accomplish this, the welding apparatus is provided with a unique workpiece grip indicated at 154 in FIG. 9. The grip includes an elongate insulating member 156 having a slot 158 therein through which extend two headed pins 160 and 162 to connect the member 156 to an edge of the foot 72. The member 166 is guided for vertical movement by the pins 160 and 162 and can move in a vertical path to an extent determined by the pins 160 and 162 relative to the ends of the slot 158. A pair of gripping fingers 164 and 166 are affixed to the member 156 as by fasteners 168 and extend below the lower end of the member 156 where they terminate in grooves 170 and 172. The fingers 164 and 166 are somewhat resilient and are spaced apart a distance slightly less than the width of the strap 138 so that the grooves 170 and 172 can engage the edges of the strap 138 and specifically the edges of the connecting portion 146 or 148.

With this arrangement, the operator can place one of the straps 138 in engagement with the fingers 164 and 166 after the stud and the ferrule are in place. The overall assembly can then be lowered into the access hole 26 and the strap 138 positioned as shown in FIG. 8. The member 156 can move as the stud is pressed against the central web 144 of the strap and the central web is pressed against the coupling cylinder 132, so that good electrical contact can be achieved between the stud, the strap, and the cylinder. After the stud 150 is welded in place, the welding apparatus is removed, at which time the fingers 164 and 166 readily disengage the portion 146 of the strap. When the studs 152 and 42 are welded through the tabs 140 and 142, the workpiece grip 154 can be positioned so as to be clear of the strap and not interfere with the subsequent welding operations.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. A method of connecting an electrically conductive wire to an external surface of an underground metal pipe, said method comprising forming a hole from the surface of the ground above the pipe down to a location near the pipe so that a portion of the surface of the pipe is exposed to the surface of the ground, affixing an electrically conductive wire to a weldable stud at a portion spaced from a weldable end thereof, and subsequently welding the weldable end of said stud to said portion of the surface of said pipe by placing the stud in a chuck of a stud welding tool, holding the tool above the surface of the ground, inserting the stud and the chuck into the hole and contacting the pipe with the weldable end of the stud, and initiating a welding cycle for the stud welding tool.

2. A method according to claim 1 characterized by cleaning any foreign material from the surface of said pipe portion prior to welding the stud thereto.

3. A method according to claim 1 characterized by affixing said electrically conductive wire to said stud by inserting an end of said wire in a recess of said stud and crimping the stud inwardly around the end of said wire.

4. A method according to claim 1 characterized by depositing an anode in the hole with said electrically conductive wire attached thereto prior to welding the stud to the pipe.

5. A method of connecting an electrically conductive wire to an external surface of an underground metal pipe, said method comprising forming a hole from the surface of the ground above the pipe down past the pipe to a point therebelow, forming a recess in the side of the hole near the pipe to expose a portion of the surface of the pipe, affixing an electrically conductive wire to a weldable stud at a portion of the stud spaced from a weldable end thereof, subsequently inserting the stud into the hole and the recess with the weldable end in contact with the surface of the pipe, and welding the weldable end of the stud to the surface of the pipe.

6. A method according to claim 5 characterized by affixing the electrically conductive wire to the stud by inserting an end of the wire in a recess of the stud and crimping the stud inwardly around the end of the wire.

7. A method according to claim 5 characterized by affixing the electrically conductive wire to an anode and depositing the anode in the hole with the wire attached thereto.

* * * * *